(12) United States Patent
Witzel

(10) Patent No.: US 6,457,401 B2
(45) Date of Patent: Oct. 1, 2002

(54) FLAVOR PLATE FOR BARBECUES AND COMBINATION OF FLAVOR PLATE AND BARBECUE

(75) Inventor: Theodore A. Witzel, Kitchener (CA)

(73) Assignee: Onward Multi-Corp. Inc., Kitchener (CA)

( * ) Notice: Subject to any disclaimer, the term of this patent is extended or adjusted under 35 U.S.C. 154(b) by 0 days.

(21) Appl. No.: 09/822,225

(22) Filed: Apr. 2, 2001

Related U.S. Application Data

(60) Provisional application No. 60/193,369, filed on Mar. 31, 2000.

(51) Int. Cl.[7] .............................. A47J 37/00; F24C 3/00
(52) U.S. Cl. .......................... 99/401; 99/446; 126/39 J; 126/41 R
(58) Field of Search .......................... 99/446, 444, 447, 99/400, 401; 126/41 R, 39 J

(56) References Cited

U.S. PATENT DOCUMENTS

| | | | | | |
|---|---|---|---|---|---|
| 5,111,803 | A | * | 5/1992 | Barker et al. | 126/41 R |
| 5,121,738 | A | * | 6/1992 | Harris | 126/25 R |
| 5,536,518 | A | * | 7/1996 | Rummel | 126/25 R |
| 5,735,260 | A | * | 4/1998 | Rimback | 126/39 J |
| 6,023,051 | A | * | 2/2000 | Fellows | 126/25 R |

* cited by examiner

Primary Examiner—Reginald L. Alexander
(74) Attorney, Agent, or Firm—Daryl W. Schnurr

(57) ABSTRACT

A flavor plate is used in a gas barbecue to replace the ceramic briquettes or lava rock used previously. The grid that is located above the burner to support ceramic briquettes is also replaced by the flavor plate. The flavor plate has several vertical passages there through but is closed off immediately above a burner of the barbecue to prevent the juices from the food being cooked from contacting the burner.

10 Claims, 5 Drawing Sheets

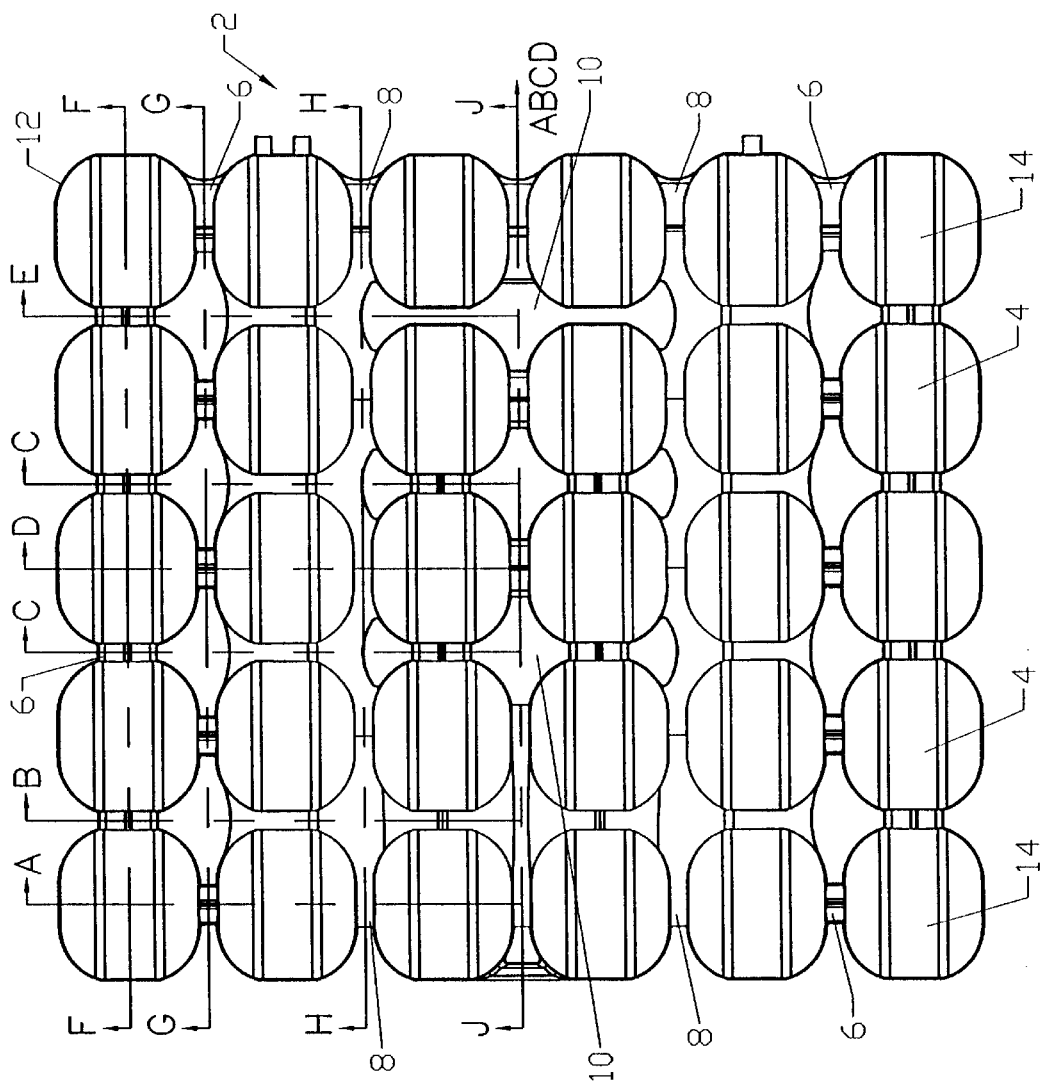
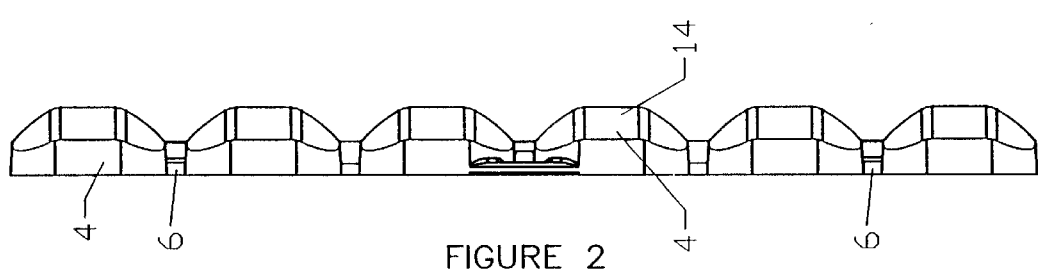

FLAVOR PLATE FOR BARBECUES AND COMBINATION OF FLAVOR PLATE AND BARBECUE

This application claims the benefit of provisional application No. 60/193,369 filed on Mar. 31, 2000.

BACKGROUND OF THE INVENTION

1. Field of the Invention

This invention relates to a flavor plate for use in a gas barbecue between a burner and a grill.

2. Description of the Prior Art

At present, gas barbecues have a burner with a grid located above the burner to support ceramic briquettes. A grill located above the briquettes supports food to be cooked. The ceramic briquettes have largely replaced lava rock. However, lava rock is porous and, when flammable juices are absorbed by the rock, food-charring flare-ups are quite common. With ceramic briquettes, there virtually aren't any flare-ups as the briquettes are not porous. Some of the juices from the food fall through the lava rock or the briquettes onto the burner. These juices often contain salts or acids that prematurely corrode the burner. The purpose of the briquettes or lava rock is to vaporize the juices to provide the food being barbecued with the unique barbecue flavor. It is therefore desirable to vaporize the juices as completely and as quickly as possible as the rising vapors flavor the foods being barbecued. Periodically, the barbecue must be cleaned and all of the briquettes or lava rock, as well as the grid, must be removed to clean the area around the burner. The flavor plate is made from cast iron but could also be made of stamp steel or other suitable material. Ideally, the flavor plate is capable of storing heat from the gas burner (not shown)

SUMMARY OF THE INVENTION

It is an object of the present invention to provide a flavor plate that replaces the briquettes and the grid in a gas barbecue and protects the burner from corrosive juices from the food being barbecued without sacrificing the distinct barbecue flavoring of the food.

A flavor plate is for use with a barbecue having a burner and a grill is used to flavor food being barbecued. The flavor plate is mounted between the burner and the grill. The flavor plate has a plurality of convex surfaces supported on a frame. The convex surfaces extend upward away from the burner when the flavor plate is in an upright position. Part of the flavor plate located immediately above the burner is closed off to prevent juices from the food being barbecued from dripping onto the burner. The remainder of the flavor plate is open with air passages between the convex surfaces so that air heated by the burner can rise through the passage directly to the grill.

Preferably, the convex surfaces are spaced apart from one another and have a generally square shape with rounded corners. A flavor plate and barbecue and combination has a flavor plate mounted between a burner and grill of the barbecue. There are no briquettes in the barbecue. The flavor plate has a plurality of convex surfaces supported on a frame. The convex surfaces extend upward away from the burner when the flavor plate is in an upright position. Part of the flavor plate located immediately above the burner is closed off to prevent juices from food being barbecued from dripping onto the burner. A remainder of the flavor plate is open with air passages between the convex surfaces so that air heated by the burner can rise through the air passages directly to the grill.

BRIEF DESCRIPTION OF THE DRAWINGS

FIG. 1 is a top view of a flavor plate;

FIG. 2 is a side view of the flavor plate in FIG. 1.

DESCRIPTION OF A PREFERRED EMBODIMENT

Figure 3:
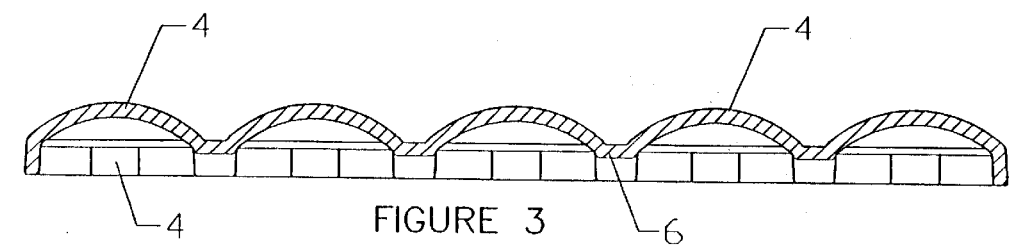
FIG. 3 is a sectional view along section F—F of FIG. 1.

Referring to FIGS. 1, 2 and 3 in greater detail, a flavor plate 2 has a plurality of convex surfaces 4 formed in one piece through connectors 6. It can be seen that an O-shaped area 8 surrounds several but not all of the convex surfaces 4. The O-shaped area 8 follows the general shape (ie. Foot print) of the burner (not shown) located immediately beneath the flavor plate 2. The shape of the O-shaped area can therefore be varied to correspond with the shape of the burners in the barbecue with which the plate is intended to be used. The area 8 will be slightly larger than the area of the burner located beneath the area 8. The convex surfaces 4 are spaced apart from one another and, while they are slightly longer than they are wide, they have a generally square shape with rounded corners. Except for the O-shaped area 8, where the convex surfaces are integrally attached to the area 8, there are air passages 10 between the convex surfaces 4. The air passages can allow air from the burner (not shown) to pass directly and quickly to the grill (not shown). The area 8 prevents juices from the food being barbecued from falling onto the burner. These juices often contain salts or acids or other corrosive components that could cause the burner to corrode prematurely.

In use, the flavor plate 2 and the convex surfaces 4 are heated by the burner. When juices fall onto the convex surfaces 4, most of the juices are vaporized before the juices reach a periphery 12 of each convex surface 4. The vaporization of the juices, of course, provides the distinctive barbecue flavor to the food being barbecued (not shown). The flavor plate 2 replaces the ceramic briquettes or other briquettes, lava rock or other heat retaining media to receive and vaporize the juices. The barbecue can be cleaned much more easily when a flavor plate is used because the flavor plate is in one piece and can be readily removed as soon as it is cooled. The plate can then be turned upside-down and the convex surfaces and top surface of the area 8 can be cleaned by burning off whatever material remains thereon from the juices. When the plate again cools, the base (not shown) of the barbecue (not shown) can be easily cleaned out by vacuuming and the flavor plate can be reinstalled into the barbecue. The flavor plate is much easier to remove than the briquettes and grill, which it replaces. From FIG. 2, it can be seen that each convex surface 4 has a flat band 14 on top and curves downward and outward from said band 14.

Figure 4:
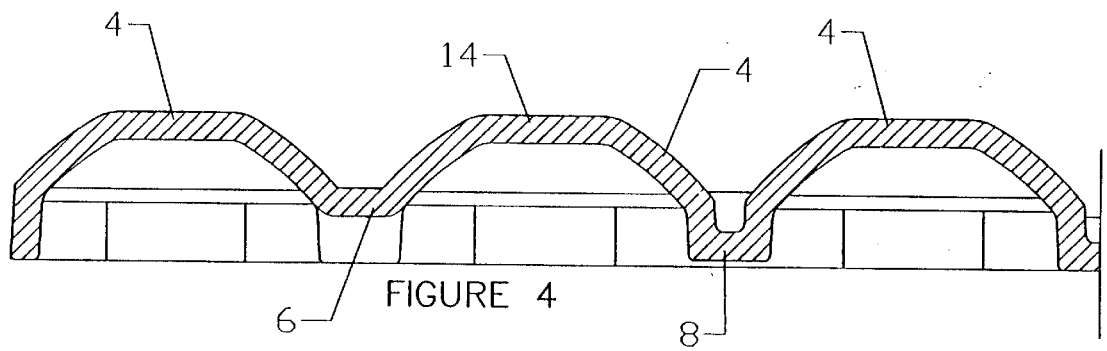
FIG. 4 is a sectional view along section A—A of FIG. 1.
Figure 5:
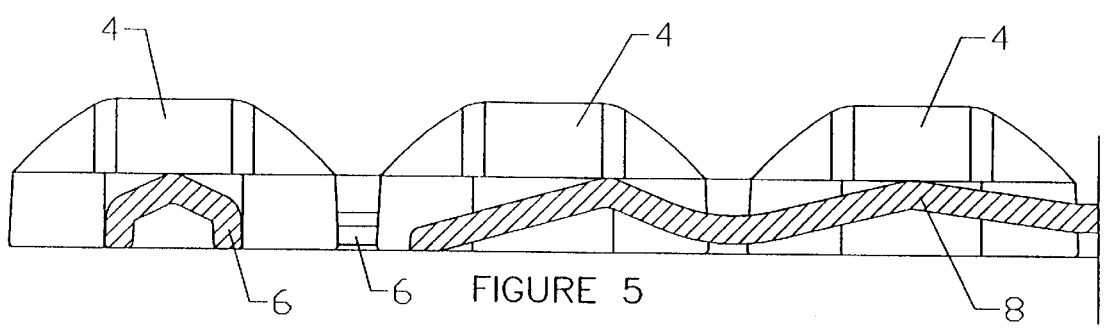
FIG. 5 is a sectional view along section B—B of FIG. 1.
Figure 6:
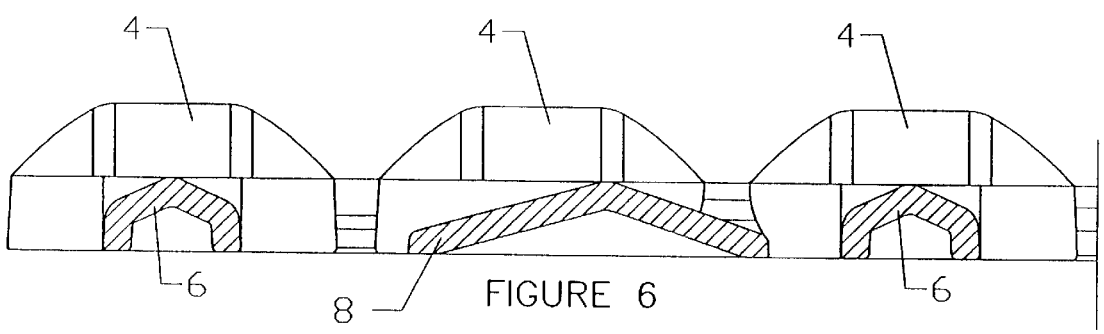
FIG. 6 is a sectional view along section C—C of FIG. 1.
Figure 7:
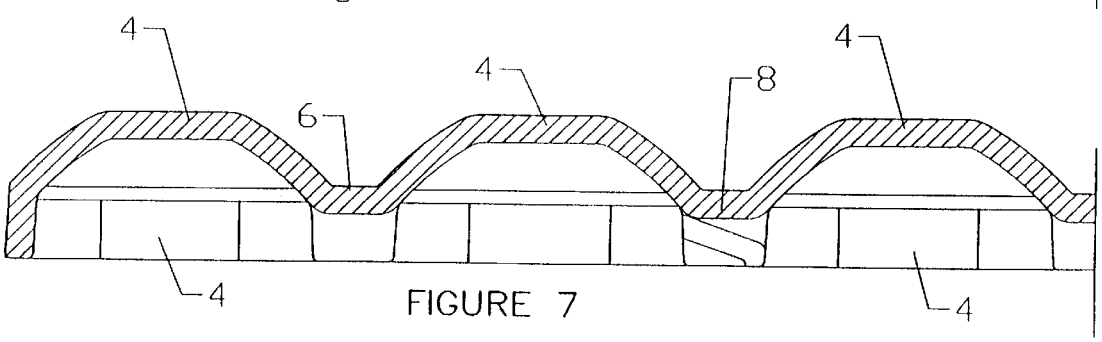
FIG. 7 is a sectional view along section D—D of FIG. 1.
Figure 8:
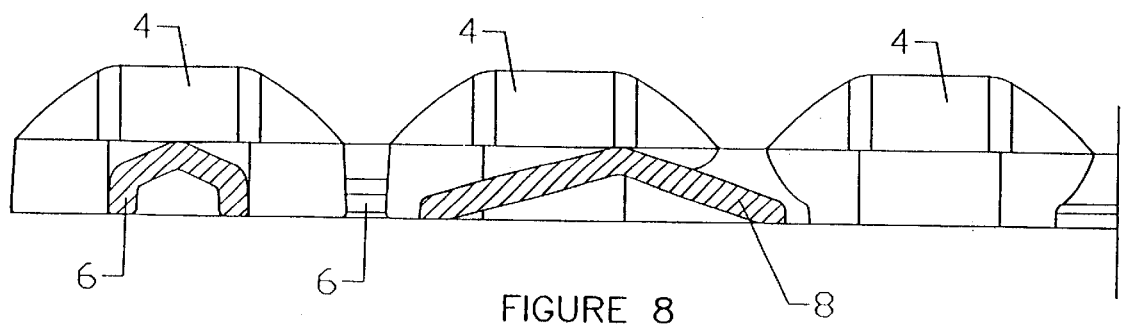
FIG. 8 is a sectional view along section E—E of FIG. 1.

In FIGS. 4 to 11, the same reference numerals are used for those components that are identical to those in FIGS. 1 to 3. In FIG. 4, the Section A—A shows the shape of three convex surfaces 4 with the area 8 joining three of the surfaces. In FIG. 5; the Section B—B extends between adjacent convex surfaces 4 with part of the connectors 6 extending beneath one of the convex surfaces 4 and the area 8 extending between the remaining two convex surfaces 4. In FIG. 6, the Section C—C shows the connectors 6 beneath the two outer convex surfaces 4 and the area 8 located beneath the center convex surface 4. In FIG. 7, the Section D—D along a center line of three convex surfaces 4 shows the connectors 6 between the convex surface on the left and the center convex surface 4 and the area 8 between the center convex surface and the convex surface 4 on the right hand side.

Figure 9:
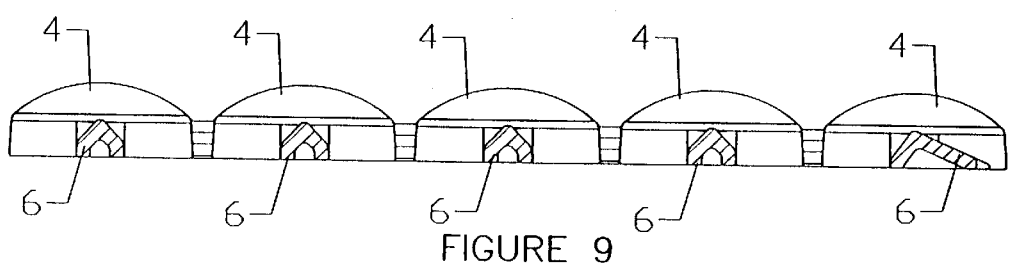
FIG. 9 is a sectional view along section G—G of FIG. 1.
Figure 10:
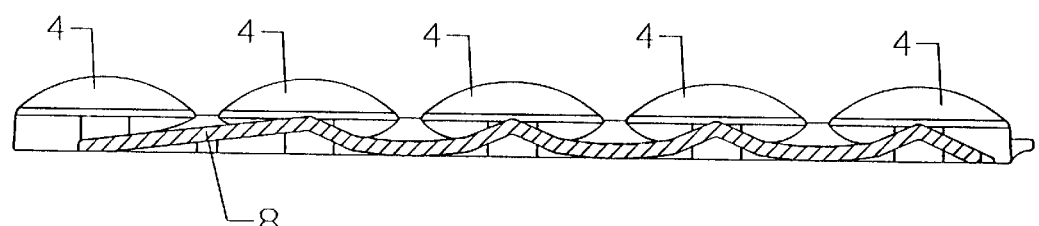
FIG. 10 is a sectional view along section H—H of FIG. 1.

In FIG. 9, the Section E—E shows part of the connectors 6 beneath the convex surface 4 and the area 8 between the center convex surface 4. In FIG. 9, the Section G—G shows the connectors 6 extending between adjacent convex surfaces 4 (only one of which is shown). In FIG. 10, it can be seen that the area 8 extends along the connectors 6 from side to side of the plate 2 beneath the convex surfaces 4. Alternatively, the area 8 could be integral with the convex surfaces 4. It can also be seen in FIG. 10 that the area 8 has sloped sections 16 sloping downward from a peak 18. Ideally, any juices on the area 8 will evaporate before reaching an edge 20. However, any juices that do not evaporate will drain off the area 8 along the edges 20.

Figure 11:
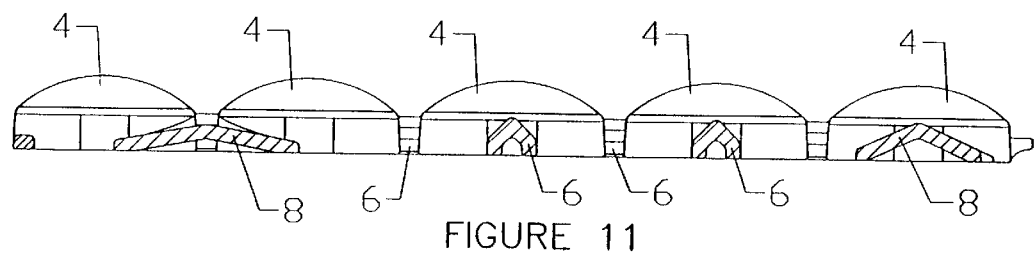
FIG. 11 is a sectional view along section J—J of FIG. 1.

In FIG. 11, the Section J—J shows the area 8 located beneath the right-hand convex surface 4 and also beneath and between the two left-hand convex surfaces 4. The third and fourth convex surfaces from the right are supported by the connectors 6.

Figure 12:
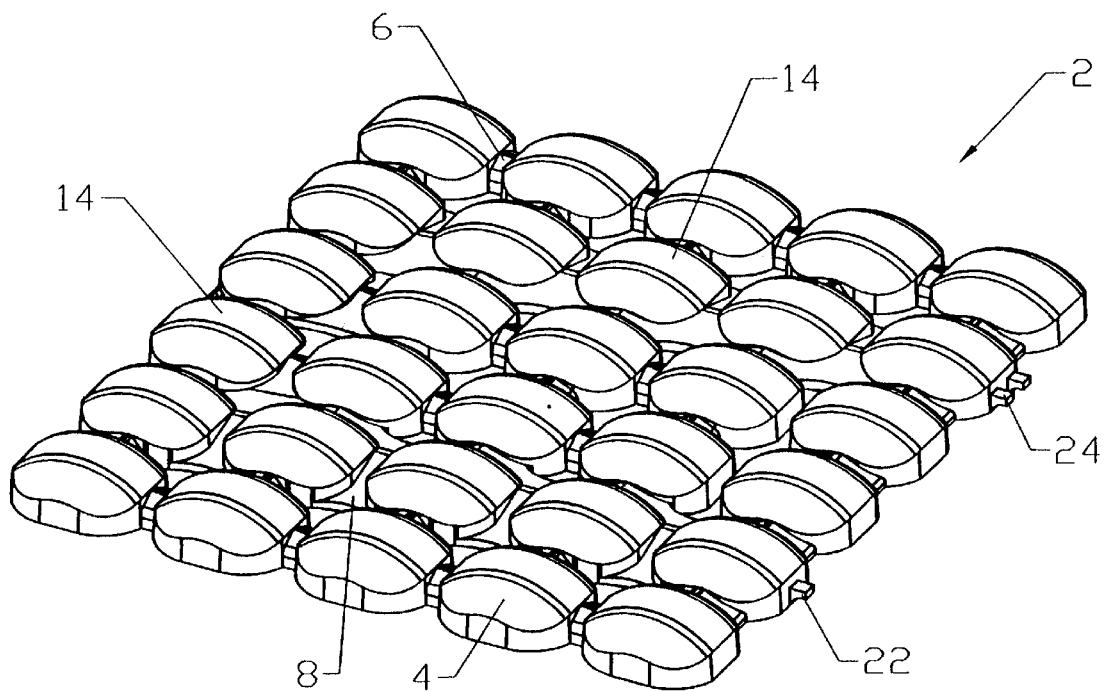
FIG. 12 is a perspective view of the flavor plate when viewed from above.
Figure 13:
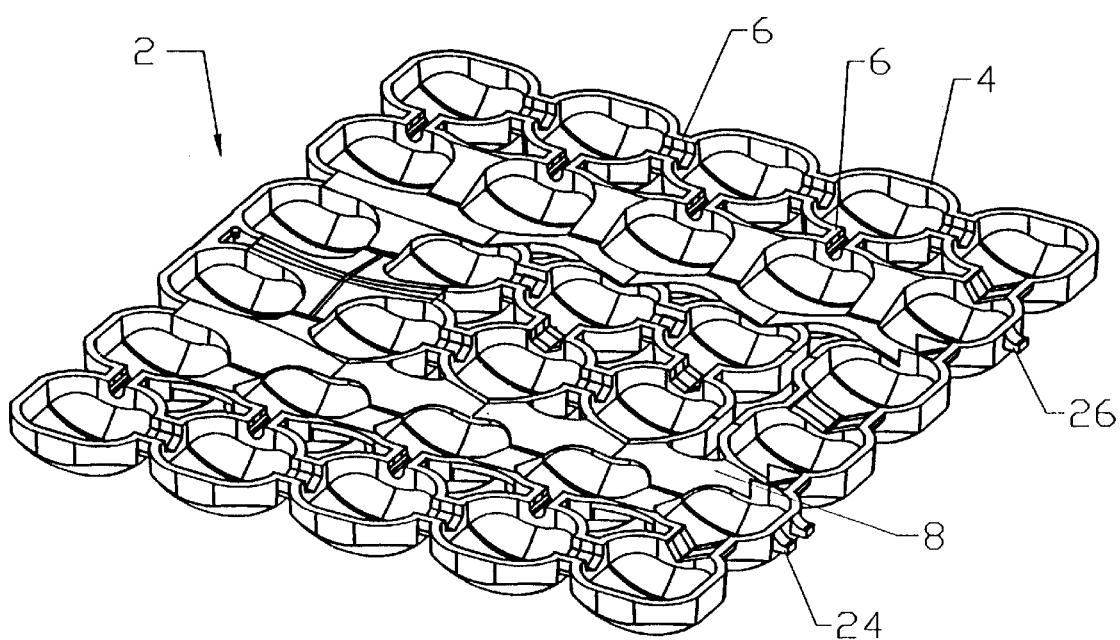
FIG. 13 is a perspective view of the flavor plate when viewed from below.

In FIGS. 12 and 13, there is shown a perspective view of the flavor plate 2 from above and below respectively. The same reference numerals are used in FIGS. 12 and 13 as those used in FIGS. 1 to 11 for those components that are identical. It can be seen that the plate 2 has a projection 22 and double projections 24 along one side thereof The projections 22, 24 fit together (like a tongue and groove) with identical projections 22, 24 on an identical second plate (not shown) that is oriented 180° to the plate 2 shown. The convex shape of the convex surfaces 4 can readily be seen from FIG. 12. From FIG. 13, it can be seen that the convex surfaces are hollow underneath.

Figure 14:
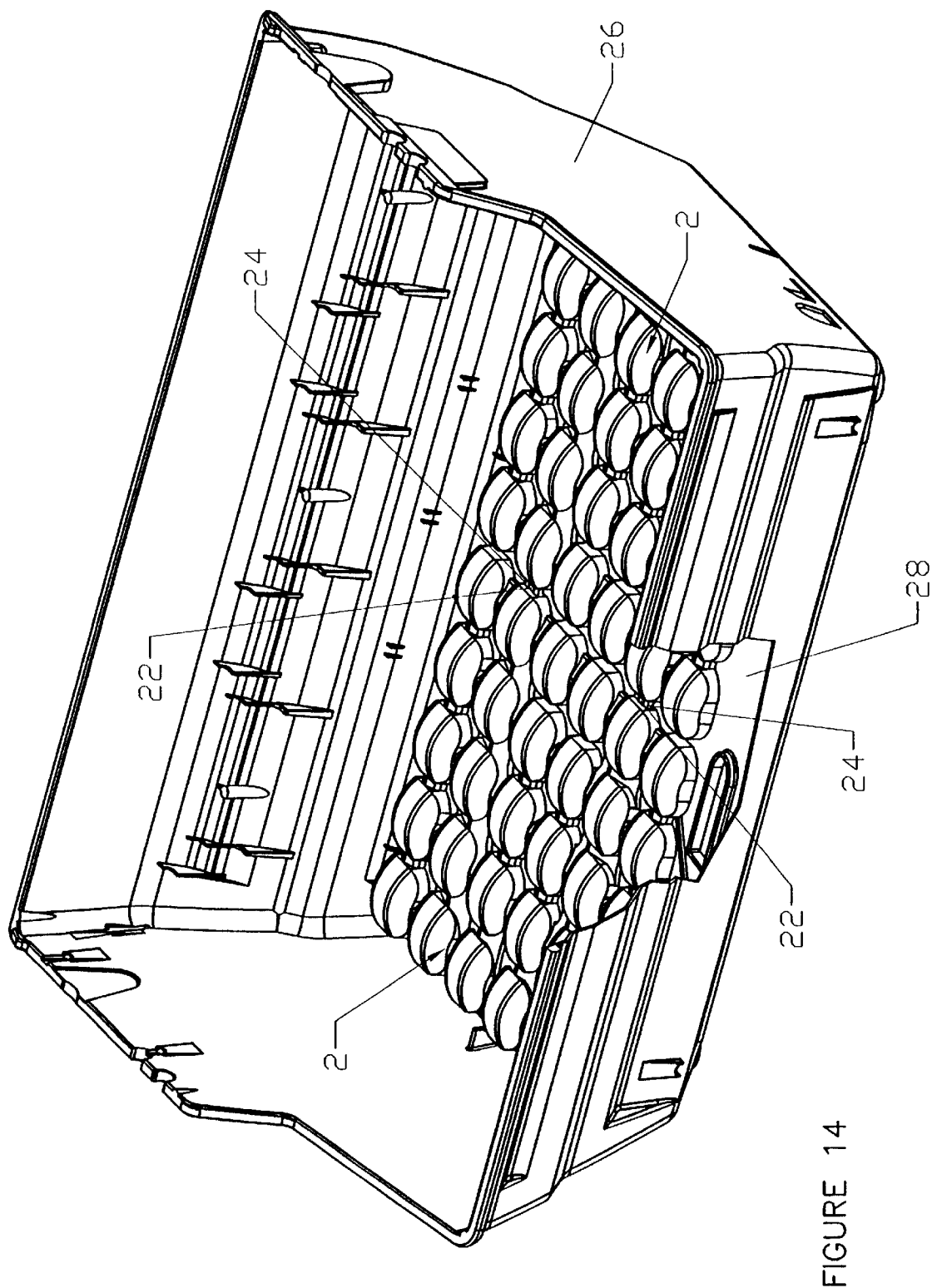
FIG. 14 is a partial perspective view of a barbecue in which a flavor plate is mounted.

In FIG. 14, a shell 26 of a part of a barbecue (not shown) contains two flavor plates 2 mounted side by side with one another above a burner 22. The grill is not shown and the lid and supports for the barbecue shelf have been deleted. The same reference numerals are used for the flavor plate as those used in FIGS. 1 to 13 for those components that are identical. The two plates 2 are oriented so that the projection 22 of one plate fits between the double projections 24 of the other plate and vice versa. The plate 2 is mounted above the burner 28 and beneath the grill (not shown).

I claim:

1. A flavor plate for use with a barbecue having a burner and a grill is used to flavor food being barbecued, said flavor plate being mounted between the burner and the grill, said flavor plate having a plurality of convex surfaces supported on a frame, said convex surfaces extending upward away from the burner when the flavor plate is in an upright position, that part of said flavor plate located immediately above said burner being closed off to prevent juices from said food barbecued from dripping onto said burner, a remainder of said flavor plate being open with air passages between the convex surfaces so that air heated by said burner can rise through said passages directly to said grill.

2. A flavor plate as claimed in claim 1 wherein said plate is in one piece with said convex surfaces being interconnected.

3. A flavor plate as claimed in claim 2 wherein said part of said flavor plate that is closed off is a generally rectangular shape with air passages in a central area of said rectangular shape.

4. A flavor plate as claimed in claim 1 wherein said frame is comprised of connectors extending between said convex surfaces and said part that is closed off.

5. A flavor plate as claimed in claim 1 wherein said convex surfaces have a generally square shape with rounded corners.

6. A flavor plate as claimed in claim 1 wherein the plate is made from cast iron.

7. A flavor plate as claimed in claim 4 wherein the plate is porcelain coated.

8. A flavor plate and barbecue in combination, said combination comprising a flavor plate mounted between a burner and grill of the barbecue, there being no briquettes in said barbecue, said flavor plate having a plurality of convex surfaces supported on a frame, the convex surfaces extending upward away from the burner when the flavor plate is in an upright position, that part of the flavor plate located immediately above the burner being closed off to prevent juices from food being barbecued from dripping onto said burner, a remainder of said flavor plate being open with air passages between the convex surfaces so that air heated by the burner can rise through the air passages directly to the grill.

9. A flavor plate and barbecuing combination as claimed in claim 8 wherein said plate is in one piece with convex surfaces being interconnected, there being two flavor plates in said barbecue mounted side by side.

10. A flavor plate as claimed in claim 8 wherein said frame is comprised of connectors extending between said convex surfaces and said part that is closed off.

* * * * *